(12) United States Patent
Imming et al.

(10) Patent No.: US 6,880,026 B2
(45) Date of Patent: Apr. 12, 2005

(54) METHOD AND APPARATUS FOR IMPLEMENTING CHIP-TO-CHIP INTERCONNECT BUS INITIALIZATION

(75) Inventors: Kerry Christopher Imming, Rochester, MN (US); Christopher Jon Johnson, Rochester, MN (US); Tolga Ozguner, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 506 days.

(21) Appl. No.: 10/147,615

(22) Filed: May 16, 2002

(65) Prior Publication Data

US 2003/0217213 A1 Nov. 20, 2003

(51) Int. Cl.[7] ............................................... G06F 13/42
(52) U.S. Cl. ..................... 710/106; 710/100; 710/305
(58) Field of Search ................................ 710/106, 305

(56) References Cited

U.S. PATENT DOCUMENTS

| | | | |
|---|---|---|---|
| 4,850,042 A | * 7/1989 | Petronio et al. ............ 398/176 |
| 5,260,608 A | 11/1993 | Marbot |
| 5,268,937 A | 12/1993 | Marbot |
| 5,412,783 A | 5/1995 | Skokan |
| 5,414,830 A | 5/1995 | Marbot |
| 5,495,357 A | * 2/1996 | Osterhout ................... 398/107 |
| 5,625,563 A | 4/1997 | Rostoker et al. |
| 6,031,473 A | 2/2000 | Kubinec |
| 6,198,752 B1 | * 3/2001 | Lee ........................ 370/395.65 |
| 6,510,549 B1 | 1/2003 | Okamura |
| 6,687,780 B1 | * 2/2004 | Garlepp et al. ............. 710/305 |
| 6,704,516 B1 | * 3/2004 | Dorsey et al. .............. 398/138 |
| 6,738,415 B2 | * 5/2004 | Drost et al. ................. 375/219 |

OTHER PUBLICATIONS

U.S. Appl. No. 10/147,682, filed May 16, 2002, "Method and Apparatus for Implementing Multiple Configurable Sub-Busses of a Point-to-Point Bus".

* cited by examiner

*Primary Examiner*—Tim Vo
(74) *Attorney, Agent, or Firm*—Joan Pennington

(57) ABSTRACT

A method and apparatus are provided for implementing chip-to-chip interconnect bus initialization. The chip-to-chip interconnect bus includes first and second unidirectional buses for full duplex communications between two chips. A lower than normal bus frequency is used during the initialization process. A transmit initialization sequencer of a source transmits predefined SYNC symbols on the connected unidirectional bus. A receive initialization sequencer of a destination chip checks for a defined number of valid SYNC or IDLE symbols. When the receive initialization sequencer of a destination detects the defined number of valid SYNC or IDLE symbols, the receive initialization sequencer triggers a transmit initialization sequencer of the destination to transmit IDLE symbols on the connected unidirectional bus. The transmitted IDLE symbols are detected by a receive initialization sequencer at the source, indicating that both ends of the interconnect bus have synchronized. Once link synchronization is established, the source transmits configuration information to the destination using normal bus messages. Programmable delay elements and configuration registers are set.

16 Claims, 5 Drawing Sheets

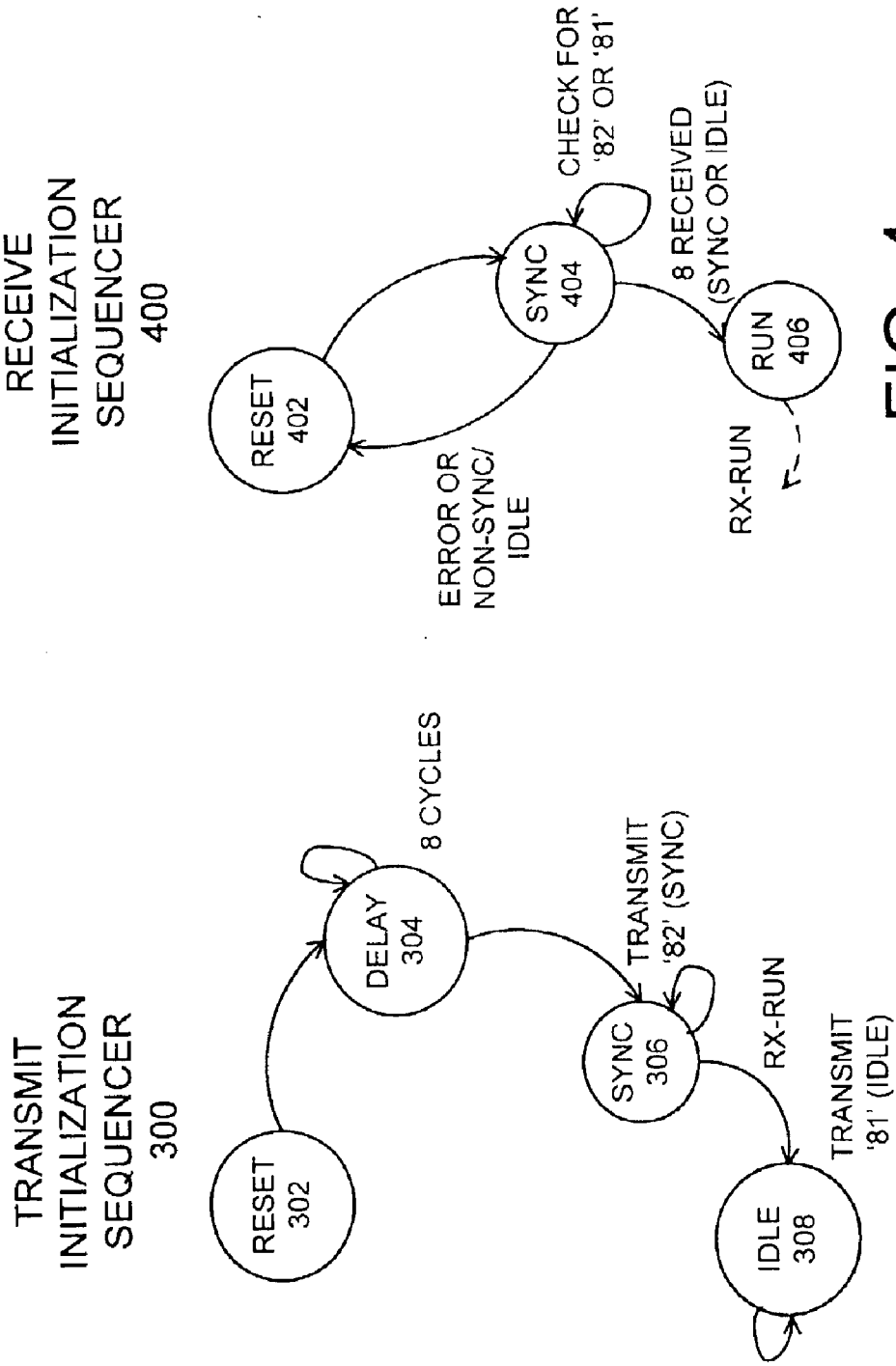

METHOD AND APPARATUS FOR IMPLEMENTING CHIP-TO-CHIP INTERCONNECT BUS INITIALIZATION

RELATED APPLICATION

A related United States patent application Ser. No. 10/147,682, entitled "METHOD AND APPARATUS FOR IMPLEMENTING MULTIPLE CONFIGURABLE SUB-BUSSES OF A POINT-TO-POINT BUS" by Jean Calvignac, Marco Heddes, Kerry Christopher Imming, Christopher Jon Johnson, Joseph Franklin Logan, and Tolga Ozguner, and assigned to the present assignee, is being filed on the same day as the present patent application.

FIELD OF THE INVENTION

The present invention relates generally to the data processing field, and more particularly, relates to a method and apparatus for implementing chip-to-chip interconnect bus initialization.

DESCRIPTION OF THE RELATED ART

Point-to-point busses are used throughout the industry to communicate between separate chips. They provide advantages over shared buses in that point-to-point or chip-to-chip busses minimize the control overhead and are capable of running at higher speeds due to their lighter loading.

Some known buses use dynamic delay adjustment and training patterns to achieve link synchronization. A need exists for an improved method and apparatus for implementing chip-to-chip interconnect bus initialization.

SUMMARY OF THE INVENTION

A principal object of the present invention is to provide a method and apparatus for implementing chip-to-chip interconnect bus initialization. Other important objects of the present invention are to provide such a method and apparatus for implementing chip-to-chip interconnect bus initialization substantially without negative effect and that overcome many of the disadvantages of prior art arrangements.

In brief, a method and apparatus are provided for implementing chip-to-chip interconnect bus initialization. The chip-to-chip interconnect bus includes a first unidirectional bus and a second unidirectional bus for full duplex communications between two chips. A first receive initialization sequencer is connected to a first end of the first unidirectional bus and a first transmit initialization sequencer coupled to the first receive initialization sequencer is connected to the first end of the second unidirectional bus. A second receive initialization sequencer is connected to a second end of the second unidirectional bus. A second transmit initialization sequencer coupled to the second receive initialization sequencer is connected to the second end of the first unidirectional bus. Each transmit initialization sequencer includes a synchronization state for transmitting predefined SYNC symbols on the connected unidirectional bus and an idle state for transmitting IDLE symbols on the connected unidirectional bus. Each receive initialization sequencer includes a synchronization state for detecting a defined number of valid SYNC or IDLE symbols; and a run state for triggering the coupled transmit initialization sequencer for transmitting IDLE symbols on the connected unidirectional bus.

In accordance with features of the invention, a lower than normal bus frequency is used during the initialization process. The transmit initialization sequencer of a source device transmits predefined SYNC symbols on the connected unidirectional bus. The receive initialization sequencer of a destination device checks for a defined number of valid SYNC or IDLE symbols. When the receive initialization sequencer of a destination detects the defined number of valid SYNC or IDLE symbols, the receive initialization sequencer triggers the transmit initialization sequencer of the destination for transmitting IDLE symbols on the connected unidirectional bus. The transmitted IDLE symbols are detected by the receive initialization sequencer at the source, indicating that both ends of the interconnect bus have synchronized. Once link synchronization is established, the source transmits configuration information to the destination using normal bus messages. Programmable delay elements and configuration registers are set.

BRIEF DESCRIPTION OF THE DRAWINGS

The present invention together with the above and other objects and advantages may best be understood from the following detailed description of the preferred embodiments of the invention illustrated in the drawings, wherein:

FIGS. 3 and 4 are block diagram representations respectively illustrating a transmit initialization sequencer and a receive initialization sequencer of the chip-to-chip interconnect of FIG. 1 in accordance with the preferred embodiment;

DETAILED DESCRIPTION OF THE PREFERRED EMBODIMENTS

Figure 1:
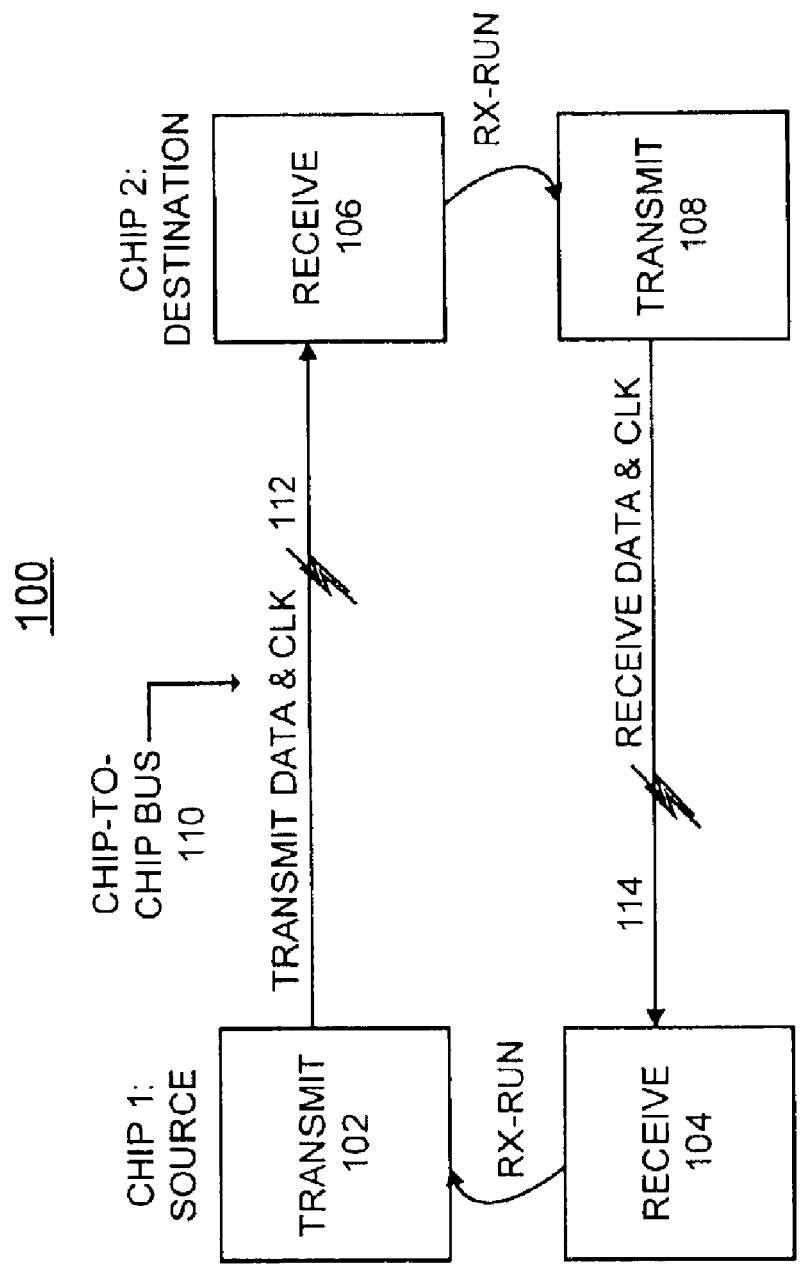
FIG. 1 is a block diagram representation illustrating a chip-to-chip interconnect for implementing chip-to-chip interconnect bus initialization in accordance with the preferred embodiment.

Having reference now to the drawings, in FIG. 1, there is shown a chip-to-chip interconnect for implementing chip-to-chip interconnect bus initialization of the preferred embodiment generally designated by the reference character 100. A first chip 1 includes a transmit block 102 and a receive block 104. A second chip 2 includes a receive block 106 and a transmit block 108.

Chip-to-chip interconnect 100 includes a chip-to-chip bus 110 formed by a pair of unidirectional buses 112 and 114 respectively connected between transmit block 102 of chip 1 and receive block 106 of chip 2, and transmit block 108 of chip 2 and receive block 104 of chip 1. The chip-to-chip bus 110 is a streaming parallel bus that provides full-duplex communication between the two devices, chip 1 and chip 2, using the two unidirectional buses 112, 114.

In accordance with features of the invention, methods are provided to initialize configuration registers and programmable, static delay elements at a receive end of a chip-to-chip interconnect bus. The chip-to-chip interconnect bus 110 is used to communicate the configuration information. This use of the chip-to-chip interconnect bus 110 removes any requirements for a side-band configuration bus or a control-point device that controls the initialization process.

In FIG. 1, a respective line labeled RX-RUN is shown from receive block 104 to transmit block 102 of chip 1 and from receive block 106 to transmit block 108 of chip 2. The RX-RUN signal is a bus initialization signal indicating that the destination receive block 104 or 106 has locked-on or synchronized.

In accordance with features of the preferred embodiment, custom CMOS designs are not required and a smaller silicon area is required as compared to conventional buses that use dynamic delay adjustment and training patterns to achieve link synchronization. The invention also allows for multiple bus configurations, for example, the chip-to-chip interconnect bus 110 can be configured to be a single 32-bit bus or 4 independent 8-bit buses which requires programmable clock selection that other buses to not have nor allow.

Figure 2:
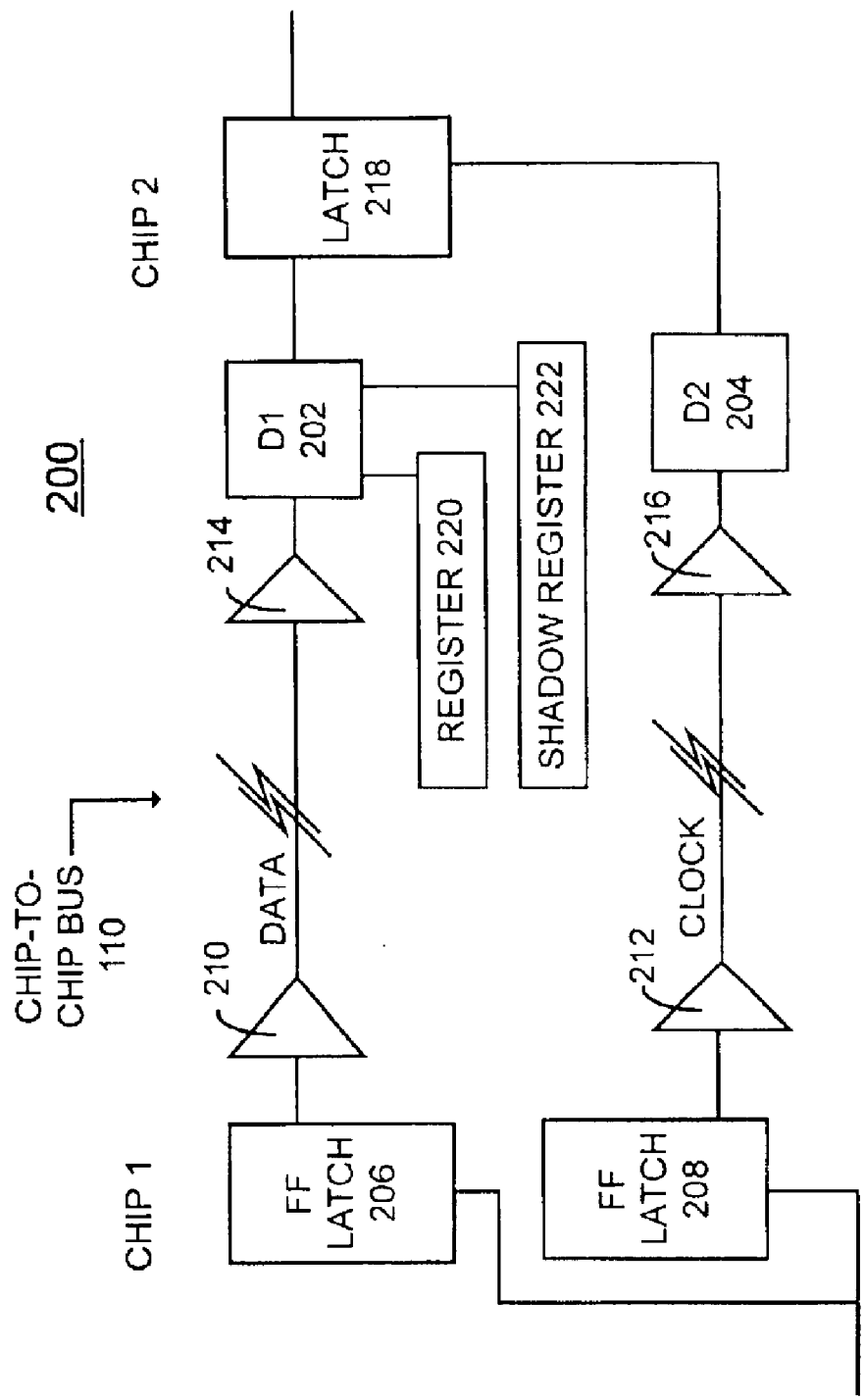
FIG. 2 is a block diagram representation illustrating an arrangement of programmable delay elements at receiving bus ends of the chip-to-chip interconnect of FIG. 1 in accordance with the preferred embodiment.

Referring now to FIG. 2, there is shown exemplary initialization circuitry of the preferred embodiment generally designated by the reference character 200 of the chip-to-chip interconnection 100. Initialization circuitry 200 includes data and clock programmable delay elements D1 202, D2 204 used to accommodate delay skew caused by wiring differences. The receiving ends of the bus 110 or receive blocks 104 and 106 contain the programmable delay elements D1 202, D2 204 that must be configured or set correctly for proper operation before switching the bus 110 to maximum frequency. There are additional registers 220, 222 that must be initialized at the far end of the bus. One end of the bus 110 is the source device that controls the initialization process, such as chip 1, and the other end of bus 110 is the destination device, as indicated in FIG. 1.

In FIG. 2, a pair of latches 206, 208, such as D-type flip-flops, receiving a clock input are coupled to a respective driver 210 and 212. Driver 210 drives for example, 32 data lines of the two unidirectional buses 112 or 114 of chip-to-chip bus 110 with one data line one and a clock line shown in FIG. 2. At the other bus end, a respective receiver 214, 216 is connected to the data and clock lines. Receiver 214 applies a data signal to the programmable delay element D1 202 that provides a data input to a latch 218, such as a D-type flip-flop. Receiver 216 applies a clock signal to the programmable delay element D2 204. A clock output of the programmable delay element D2 204 is applied to the clock input of latch 218. Register 220 and shadow register 222 coupled to the programmable delay element D1 202 receive configuration information that is transmitted to the destination device, such as chip 2, from the designated source device, such as chip 1.

Figure 5:
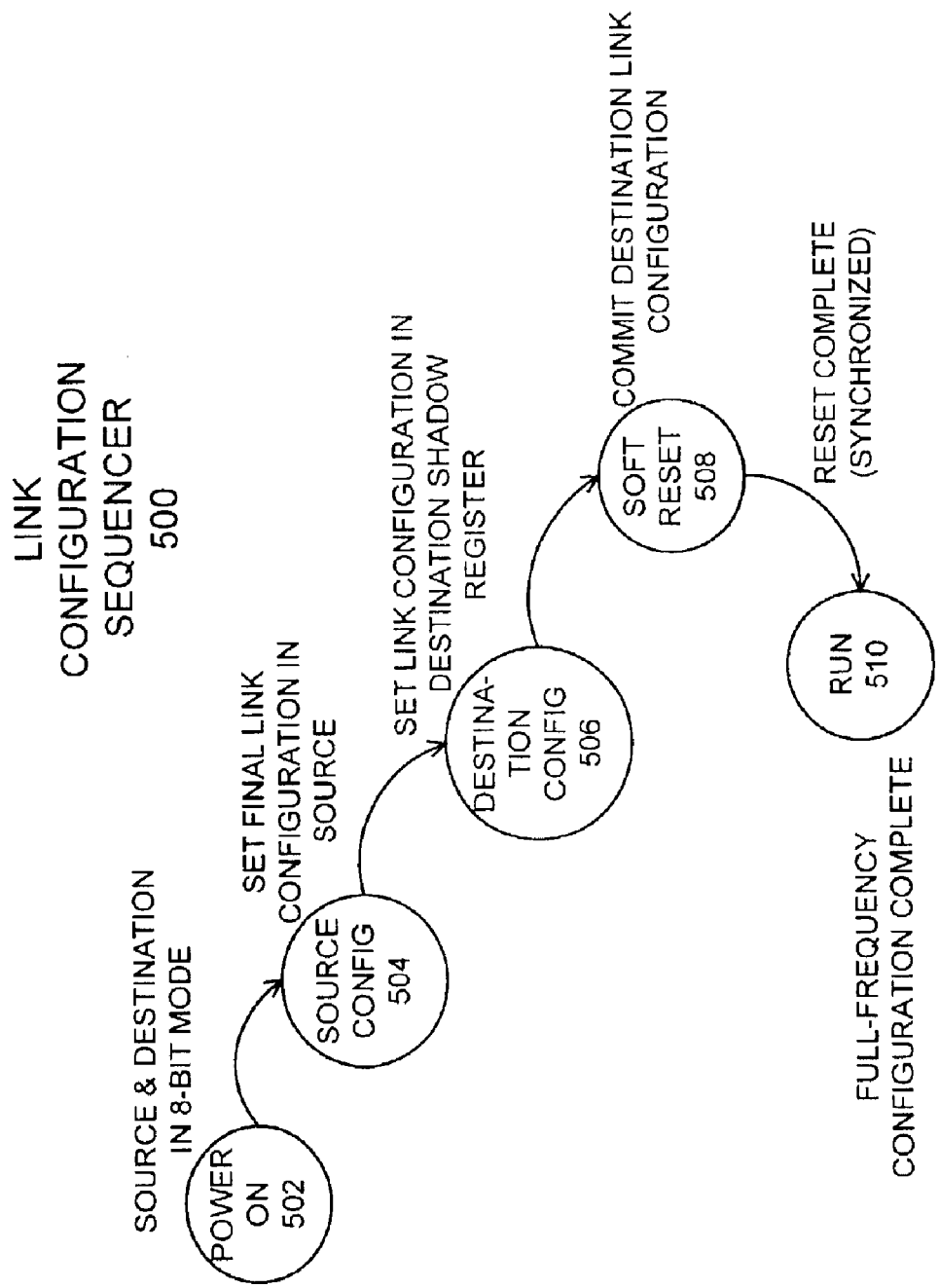
FIG. 5 is a block diagram representation illustrating a link configuration sequencer of the chip-to-chip interconnect of FIG. 1 in accordance with the preferred embodiment.
Figure 6:
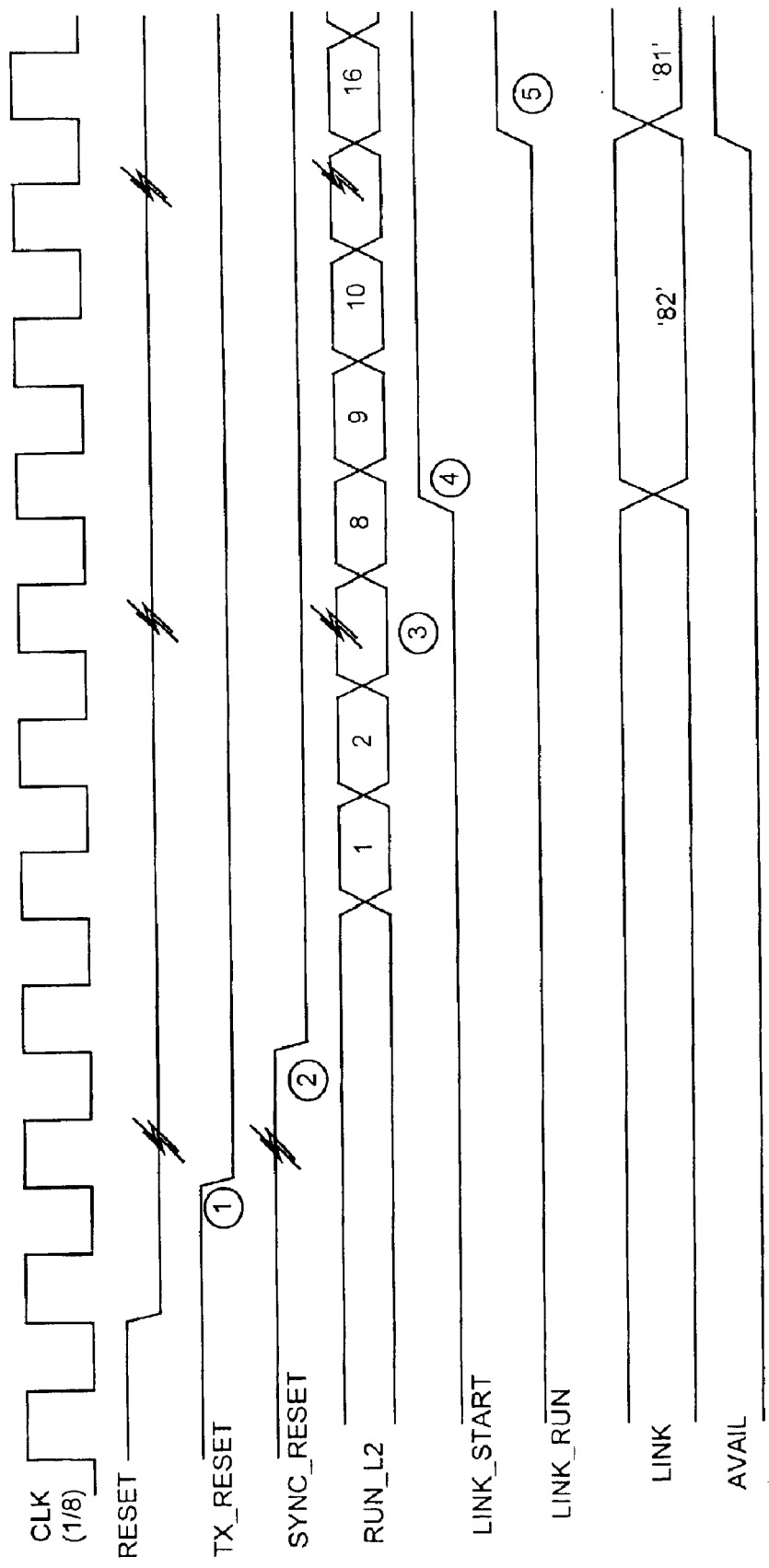
FIG. 6 is a timing diagram illustrating an exemplary initialization process in accordance with the preferred embodiment.

Referring to FIGS. 3, 4, 5, and 6, bus initialization and bus configuration processing of the preferred embodiment is illustrated. FIGS. 3 and 4 respectively illustrate a transmit initialization sequencer 300 and a receive initialization sequencer 400 of the chip-to-chip interconnect 100 in accordance with the preferred embodiment. FIG. 5 illustrates a link configuration sequencer 500 of the chip-to-chip interconnect 100 in accordance with the preferred embodiment. FIG. 6 provides a timing diagram illustrating the bus initialization and configuration process from the point-of-view of a source end of the bus 110, such as at the chip 1 bus end of chip-to-chip interconnect 100.

In accordance with features of the preferred embodiment, at power-on reset and in the default configuration, the bus 110 runs at a first low frequency that guarantees proper operation with the default settings of the programmable delay elements D1 202, D2 204. Normal bus frequency is, for example, 250 MHz that provides bus throughput of 500 Mbps per pin. The bus 110 runs, for example, at 1/8 frequency of the normal bus frequency, such as 31 MHz, at power-on reset and in the default configuration.

Referring now to FIGS. 3 and 4, the transmit initialization sequencer 300 and the receive initialization sequencer 400 respectively begin at a reset state 302 and a reset state 402. The chip-to-chip bus 110 uses an IDLE symbol pattern of x81 to indicate there is no message traffic being transmitted across the bus 110. For synchronization at startup chip-to-chip bus 110 uses a SYNC symbol pattern of x82. Transmit initialization sequencer 300 includes a delay state 304 providing a set delay, such as 8 cycles, followed by a synchronization (SYNC) state 306. In a synchronization (SYNC) state 306, the transmitter, such as transmit 102 of source chip 1, begins transmitting SYNC symbols. SYNC x82 symbols are transmitted until the receiver detects a defined number of valid SYNC x82 or IDLE x81 symbols with no errors or intervening symbols, such as, 8 valid SYNC x82 or IDLE x81 symbols.

At a SYNC state 404 of the receive initialization sequencer 400, the receiver at the destination end of the bus monitors incoming traffic for SYNC or IDLE symbols from the transmitter at the source end of the bus. After 8 SYNC or IDLE symbols are detected without any intervening errors, the receiver enters a link running (RUN) state 406. The RUN state 406 triggers the transmitter at the same destination end of the bus to start transmitting IDLE symbols. These IDLE symbols are detected at the opposite source end of the bus to indicate that link synchronization has occurred. The transmit initialization sequencer 300 enters an idle state 308 to start transmitting IDLE symbols. The source end of the bus detects that both ends of the bus have correctly synchronized.

In accordance with features of the preferred embodiment, the chip-to-chip bus 110 is used to communicate with the far end of the bus once synchronization is established. Configuration information is transmitted using normal bus messages from the source device to the destination device. After the configuration is written, the source device initiates a soft reset that commits the delay and configuration information and starts a new link synchronization sequence. After this second link synchronization has completed the bus runs at normal bus frequency and in the requested configuration. The delayed committing of configuration information is required because setting the programmable delay values for the clocks and some of the configuration bits can cause the link clocks to glitch. The resynchronization process allows the system to resynchronize and continue correct operation in a selected bus configuration.

Referring now to FIG. 5, the link configuration sequencer 500 starts at a power-on state 502 with the source and destination in an 8-bit bus mode. The master end of the bus 110 stores the configuration data. The final link configuration is set in the source register 220 as indicated in a source configuration state 504. The link configuration is set in the destination shadow register 222 as indicated in a destination configuration state 506. As indicated in a soft reset state 508 the destination link configuration commits, the destination register 220 is loaded from the destination shadow register 222. After the soft reset is complete, communication is in the final bus mode of 8-bit, 16-bit, or 32-bit, the bus is synchronized and running at full frequency in the requested configuration as indicated in a run state 510.

In FIG. 6, the top of diagram a clock labeled CLK (1/8) represents the 1/8 frequency operation at power-on reset and in the default configuration of the bus 110. A chip wide reset signal is represented at a next line below CLK (1/8) labeled RESET. In FIG. 6, encircled numbers 1–5 indicates sequential steps. As indicated at 1, first TX_RESET is deasserted causing the bus 110 to run at ⅛ frequency of the normal bus frequency. As indicated at 2, after 16-cycles SYNC_RESET is deasserted for the rest of the chip-to-chip bus initialization and bus configuration processing. As indicated at 3, RUN_L2 delays for 8 cycles, then starts looking for SYNC/IDLE symbols on the bus 110. As indicated at 4, LINK_START is asserted. If any symbols other than SYNC/IDLE symbols are received during this time, RUN_L2 is reset to delay for 8 cycles. As indicated at 5, after 8 SYNC/IDLE symbols are successfully received, the destination enters RUN mode or state 406 and LINK_RUN is asserted internally. At this point the IDLE x81 symbols are transmitted as shown at LINK. As shown at line labeled AVAIL, the tx_avail signal is also asserted and messages from the logical layer are now accepted. When the IDLE x81 symbols are detected, a destination link running status bit is set to indicate that the other end of the link has synchronized.

While the present invention has been described with reference to the details of the embodiments of the invention shown in the drawing, these details are not intended to limit the scope of the invention as claimed in the appended claims.

What is claimed is:

1. Apparatus for implementing chip-to-chip interconnect bus initialization, said chip-to-chip interconnect bus comprising a first unidirectional bus and a second unidirectional bus for full duplex communications between two chips, said initialization apparatus comprising:
    a first receive initialization sequencer connected to a first end of said first unidirectional bus;
    a first transmit initialization sequencer coupled to said first receive initialization sequencer connected to said first end of said second unidirectional bus;
    a second receive initialization sequencer connected to a second end of said second unidirectional bus;
    a second transmit initialization sequencer coupled to said second receive initialization sequencer connected to said second end of said first unidirectional bus;
    each said transmit initialization sequencer including a synchronization state for transmitting predefined SYNC symbols on said connected unidirectional bus; and an idle state for transmitting IDLE symbols on said connected unidirectional bus;
    each said receive initialization sequencer including a synchronization state for detecting a defined number of valid SYNC or IDLE symbols; and a run state responsive to detecting said defined number of valid SYNC or IDLE symbols for triggering said coupled transmit initialization sequencer for transmitting IDLE symbols on said connected unidirectional bus.

2. Apparatus for implementing chip-to-chip interconnect bus initialization as recited in claim 1 includes a first bus frequency used during an initialization sequence; said first frequency being substantially less than a normal bus frequency.

3. Apparatus for implementing chip-to-chip interconnect bus initialization as recited in claim 1 wherein each said transmit initialization sequencer and each said receive initialization sequencer includes a reset state starting an initialization sequence.

4. Apparatus for implementing chip-to-chip interconnect bus initialization as recited in claim 1 wherein said transmit initialization sequencer includes a delay state providing a set delay before starting said synchronization state.

5. Apparatus for implementing chip-to-chip interconnect bus initialization as recited in claim 1 includes programmable delay elements coupled to said first end of said first unidirectional bus and programmable delay elements coupled to said first end of said second unidirectional bus.

6. Apparatus for implementing chip-to-chip interconnect bus initialization as recited in claim 5 includes configuration registers coupled to said first end of said first unidirectional bus and programmable delay elements coupled to said first end of said second unidirectional bus.

7. Apparatus for implementing chip-to-chip interconnect bus initialization as recited in claim 6 wherein said programmable delay elements and said configuration registers are set after bus synchronization is established.

8. Apparatus for implementing chip-to-chip interconnect bus initialization as recited in claim 6 wherein said configuration registers are set for multiple bus configurations.

9. Apparatus for implementing chip-to-chip interconnect bus initialization as recited in claim 6 wherein said programmable delay elements and said configuration registers are set using said chip-to-chip interconnect bus to communicate configuration information.

10. Apparatus for implementing chip-to-chip interconnect bus initialization as recited in claim 9 wherein said configuration information is transmitted on said chip-to-chip interconnect bus from a source to a destination using bus messages.

11. A method for implementing chip-to-chip interconnect bus initialization comprising the steps of:
    utilizing a source transmitter, transmitting predefined SYNC symbols on said chip-to-chip interconnect bus;
    utilizing a destination receiver, checking for a predefined number of valid SYNC or IDLE symbols on said chip-to-chip interconnect bus;
    said destination receiver responsive to said detecting said defined number of valid SYNC or IDLE symbols, for triggering a destination transmitter;
    said destination transmitting IDLE symbols on said chip-to-chip interconnect bus; and
    utilizing a source receiver, detecting said transmitted IDLE symbols on said chip-to-chip interconnect bus to identify interconnect bus synchronization.

12. A method for implementing chip-to-chip interconnect bus initialization as recited in claim 11 includes the step of utilizing a first low frequency clock for running said chip-to-chip interconnect bus.

13. A method for implementing chip-to-chip interconnect bus initialization as recited in claim 11 further includes the step responsive to identifying interconnect bus synchronization of transmitting configuration information from a source on said chip-to-chip interconnect bus to a destination.

14. A method for implementing chip-to-chip interconnect bus initialization as recited in claim 13 wherein the step of transmitting configuration information from a source on said chip-to-chip interconnect bus to a destination includes the step of utilizing predefined bus messages for transmitting configuration information.

15. A method for implementing chip-to-chip interconnect bus initialization as recited in claim 13 further includes the step of setting programmable delay elements coupled to said destination receiver.

16. A method for implementing chip-to-chip interconnect bus initialization as recited in claim 15 further includes the steps of initiating a soft reset to commit delay and configuration information; performing a second synchronization sequence; and utilizing a second predefined frequency clock for running said chip-to-chip interconnect bus.

* * * * *